United States Patent [19]

Liang et al.

[11] 3,709,734

[45] Jan. 9, 1973

[54] CATHODES FOR SOLID ELECTROLYTE CELLS

[75] Inventors: Charles C. Liang, Andover, Mass.; Carl R. Schlaikjer, Arlington, Mass. 02174

[73] Assignee: P. R. Mallory & Co., Inc., Indianapolis, Ind.

[22] Filed: Feb. 9, 1971

[21] Appl. No.: 113,989

[52] U.S. Cl. ............................... 136/83 R, 136/137
[51] Int. Cl. ............................................. H01m 15/00
[58] Field of Search ........ 136/83, 137, 153, 20, 86, 6, 136/26, 120

[56] References Cited

UNITED STATES PATENTS

| | | | |
|---|---|---|---|
| 3,476,605 | 11/1969 | Owens | 136/83 R |
| 3,476,606 | 11/1969 | Owens | 136/83 R |
| 3,455,742 | 7/1969 | Rao | 136/83 R |
| 3,463,670 | 8/1969 | Rao et al. | 136/83 R |
| 3,423,243 | 1/1969 | Kordesch et al. | 136/86 |
| 3,328,202 | 6/1967 | Riffe | 136/22 |
| 3,258,360 | 6/1966 | Kordesch | 136/6 |
| 3,492,164 | 1/1970 | Wolfe | 136/86 |
| 3,513,027 | 5/1970 | Liang et al. | 136/83 R |
| 3,567,518 | 3/1971 | Smyth et al. | 136/153 |

*Primary Examiner*—Anthony Skapars
*Attorney*—Robert Levine

[57] ABSTRACT

A solid state battery comprising cathode materials, in composition including an iodide in which the electrochemical activity of the cathode material has the benefit of elemental iodine. The corrosive action of volatized iodine of conventional cathodic materials on the related elements of the solid electrolyte battery is reduced by the iodine being held in a solid chemical compound as a defined iodine complex and further reduced by the use of a lead dioxide current collector, which neither reacts with nor absorbs the active component of the cathode, thus isolating other battery components from the chemical action of iodine by preventing absorption and subsequent diffusion of iodine vapor from the cathode mixture.

9 Claims, 1 Drawing Figure

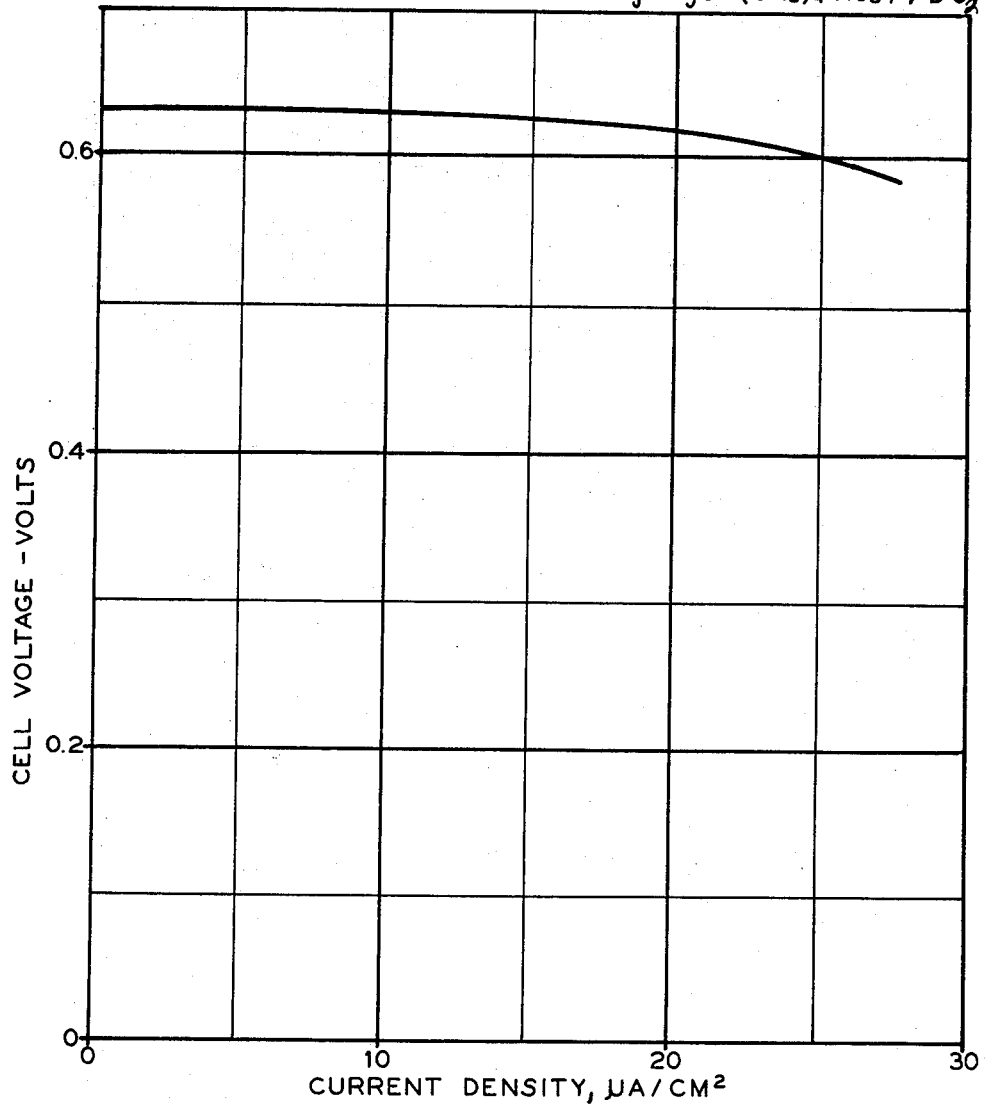

CATHODES FOR SOLID ELECTROLYTE CELLS

This invention relates to a solid electrolyte battery system, comprising a highly active halogen cathode held in a solid stable chemical compound to limit evolution and volitalization of the halogen that could and would otherwise cause corrosion and deterioration of the associated elements of the solid electrolyte battery and its container. The vapor from this chemical compound is further contained by a substance which will neither react with nor adsorb the halogen, namely lead dioxide, which is an efficient electronic conductor acting in addition as the cathode current collector.

Miniaturization in electronics has been rapidly advancing in recent years and has resulted in increased demand for special power sources characterized by volume and weight comparable to those of the miniaturized electronic components employed in the circuitry. A significant degree of success in meeting this demand has been achieved by employing solid electrolyte cells. Apart from the advantages of miniaturization, solid electrolyte cells and batteries permit great flexibility in design, and usually offer activated shelf-lives longer than can be realized with conventional systems.

In order to obtain high electrochemical reactivity for solid electrolyte battery cathodes, elemental halogens, particularly iodine, have been utilized in solid electrolyte battery systems. But in the case of cathode materials containing elemental iodine where the iodine by sublimation became a developed free agent to the extent that it vaporized from its initial cathodic form as originally assembled in manufacture, the highly corrosive effect of the iodine vapor on the associated elements or casing of the cells became detrimental to the operation of the battery, and substantially reduced the shelf life as well. This detrimental effect is due primarily to the concentrated effect of the corrosion within the predesigned relatively small and limited volumetric space of the battery or cell, within which the solid electrolyte and solid cathode were utilized. Investigations in the solid electrolyte battery field have attempted to decrease the $I_2$ vapor pressure be employing adsorbents such as graphite, charcoal, starch etc. However, the iodine vapor pressure under the adsorbed conditions is still too high to render iodine of practical use in such a cell.

However, because of the desirable high chemical reactivity of the halogens, particularly bromine and iodine, and the consequent desirability of utilizing such elements in solid complexes for solid electrolyte battery systems, the problem of greatest importance is to overcome or to eliminate those corrosive effects so that highly reactive halogens could be used, particularly as cathodes, as part of a solid cathode complex with reduced corrosive action towards other cell components. The cathode materials of this invention are chemical compounds including halide-halogen complexes which have well defined melting points. For example, the melting point of $CsI_3$ is 207.5° C. The vapor pressure of iodine over $CsI_3$ at 25°C is only $9.2 \times 10^{-4}$ Torr, while that of molecular solid iodine at 25° C is 0.308 Torr, over 300 times greater; yet the electrochemical activity of the iodide ion is comparable to that of iodine. Another feature of this invention is that $PbO_2$ as a current collector in an iodine based solid electrolyte cell provided negligible electrical resistance, at the same time neither reacting with nor adsorbing the halogen vapor, thus offering no mechanism whereby the halogen vapor may diffuse or otherwise be transported to other cell components. Graphite, the collector material hitherto employed for this purpose adsorbs iodine and by this mechanism allows the iodine to pass through its compacted mass.

It is an object of the present invention to improve solid electrolyte cells.

It is a further object of the present invention to provide novel and improved high energy solid electrolyte cells and batteries having an extremely long shelf life and a large and continuous output of electrical energy for its size.

It is a further object of this invention to improve the shelf life of halogen based solid electrolyte cells by providing a cathode which will have a high electrochemical reactivity without forming a vaporizing element that could corrode the cell and closure elements.

It is a further object of this invention to provide a solid trihalide suitable for use as a cathode material for a solid electrolyte cell, in which the corrosive vapor of elemental halogen is reduced by chemical combination with a halide salt, and at the same time reduced still further by the use of a lead dioxide current collector immune to the chemical action of the halogen and incapable of adsorbing and transmitting volatile halogen vapors; with the lead dioxide being resistant to the corrosive nature of iodine based cathodes, inert to the cell reaction, a good electronic conductor, and not adsorbing iodine, thus isolating the cell casing and components from the direct chemical action of halogen vapors escaping from the cathode material.

Generally speaking, the present invention comprises a solid state battery having a cathode composition including an iodide in which the electrochemical activity of the cathode material has the benefit of elemental iodine. The corrosive action of volatilized iodine of conventional cathodic materials on the related elements of the solid electrolyte battery is reduced by the iodine being held in a solid chemical compound as a defined iodine complex and further reduced by the use of a lead dioxide current collector which neither reacts with nor absorbs the active components of the cathode. Thus the other battery components are isolated from the chemical action of iodine by preventing adsorption and subsequent diffusion of iodine vapor from the cathode mixture.

The active cathode materials described in this invention are difficulty soluble trihalide salts of alkali metals, pyridine and quarternary ammonium ions such as $CsI_3$, $(CH_3)_4NI_3$, $(C_2H_5)_4NI_3$, $(C_3H_7)_4NI_3$, $(C_4H_9)_4NI_3$, $C_5H_5NHI_3$, and $C_5H_5NHBr_3$, etc. recovered by precipitation from aqueous solution or by direct reaction of halogen with a halide salt. The triiodides can be synthesized by the following procedures:

A solution of the appropriate metal, amine, or tetraalkyl ammonium salt such as CsCl or $(CH_3)_4NCl$ is treated with a solution of iodine in aqueous potassium, sodium, or ammonium iodide. The precipitate formed from this reaction is the triiodide of the cesium, tetraalkylammonium, or pyridinium salts mentioned above. Tribromides are prepared in a similar fashion, for example, where pyridinium bromide, $C_5H_5NHBr$, is treated with an agueous solution of bromide and an alkali bromide.

Tetramethylammonium triiodide as the cathode and lead dioxide as the current collector were tested together in the following cell (1):

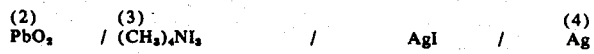

Current collector Cathode Electrolyte Anode

1. The apparent surface area of the cell is 0.8 cm$^2$ and the total thickness of the cathode and the separator is 3mm. Various cells were prepared from finely ground powders pressed between 20,000 and 80,000 lbs/in$^2$.
2. $PbO_2$ + 3 weight % graphite.
3. 20 Wt. percent $(CH_3)_4NI_3$ + 50 Wt. percent AgI + 30 Wt. percent graphite
4. 50 Wt. % Ag + 20 wt. percent AgI + 30 wt. percent graphite The open circuit voltage of the test cell was 0.64 V which was in good agreement with the theoretical voltage of the $(CH_3)_4NI_3$-Ag system. This agreement proves that the $PbO_2$ layer serves as a current collector only and is not involved in the cell reaction.

FIG. 1 of the drawing depicts polarization as a function of current density in the cell described above.

The following table shows the IR loss of the cell under various current drains at room temperature. From these results, the internal resistance of the cell was computed to be 3,000 ohms.

| Current | 10λA | 20λA | 30λA |
|---|---|---|---|
| IR loss | 0.03V | 0.06V | 0.09 to 0.1V |

This is in good agreement with the predicted value based on the conductivity of AgI at room temperature. Therefore, the electrical resistance due to $PbO_2$ is negligible and the current collector is indeed a good electronic conductor. The $PbO_2$ cathode current collector was tested with a high voltage cell (5):

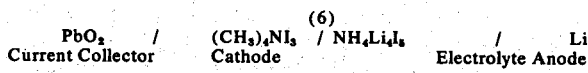

| $PbO_2$ | / | $(CH_3)_4NI_3$ | / | $NH_4Li_4I_5$ | / | Li |
| Current Collector | | Cathode | | Electrolyte | | Anode |

(5) The apparent surface area of the cell is 0.97 cm$^2$. The thickness of the electrolyte is 0.018 cm and the thickness of the cathode is approximately 0.05 cm.

(6) 20 wt. percent $(CH_3)_4NI_3$ + 80 wt. percent $NH_4Li_4I_5$. The open circuit voltage of the test cell was 2.8V which was in good agreement with the theoretical value for the $(CH_3)_4NI_3$-Li system. Therefore, the $PbO_2$ layer indeed serves as a current collector and is not involved in the cell reaction.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

What is claimed is:

1. A solid electrolyte cell comprising an anode; a solid ionic conducting electrolyte; and a cathode comprising a trihalide of the form $RX_3$, where R is an element or radical selected from the group consisting of alkali metals, pyridinium, and tetra-alkyl ammonium ions, and where $X_3$ is a trihalide selected from the group consisting of triiodide and tribromide; and a non-metallic current collector of negligible electrical resistance coupled thereto having a characteristic property such that halogen vapor from the trihalide cathode will neither react with nor be adsorbed on and penetrate said collector.

2. A solid electrolyte cell, as in claim 1, in which said electrolyte comprises a compound containing iodine as one element; said cathode comprises one of said trihalide compounds embodying a triiodide; and said current collector is a non-metal electronic conductor which will neither react with nor absorb iodine vapor.

3. A solid electrolyte cell, as in claim 1, in which said electrolyte comprises a compound containing one element from the halogen group including iodine and bromine; said cathode comprises one of said trihalides containing one element from said halogen group corresponding to said halide in said electrolyte; and said current collector is $PbO_2$.

4. A solid electrolyte cell, as in claim 1, in which said trihalide is a triiodide, and said electrolyte is a compound containing iodine.

5. A solid electrolyte cell, as in claim 1, in which said solid electrolyte compound has high ionic conductivity and embodies a chemical element of said cathode as an element of said electrolyte compound; and said solid cathode compound consisting of a mix of a quantity of said electrolyte compound and of a quantity of a compound constituting a trihalide.

6. A solid electrolyte cell, as in claim 5, in which said anode consists at least of a metal element; and said electrolyte consists of a compound having one element corresponding to said anode element and at least another element as a halide corresponding to the trihalide of said cathode.

7. An electrolyte cell, as in claim 4, in which said electrolyte contains an element corresponding to the metal element of the anode or in which said electrolyte is contained in the anode as a compound.

8. An electrochemical cell comprising a silver metal anode; solid material silver iodide electrolyte; a cathode comprising a compound selected from the group consisting of $CsI_3$, $(CH_3)_4NI_3$, $(C_2H_5)_4NI_3$, $(C_3H_7)_4NI_3$, $(C_4H_9)_4NI_3$, $C_5H_5NHI_3$, and $C_5H_5NHBr$; and a lead dioxide current collector.

9. An electrochemical cell, as in claim 8, in which said anode is lithium metal; and in which said electrolyte is the solid material $NH_4Li_4I_5$.

* * * * *